Dec. 6, 1960 G. J. MUMPER 2,962,943
MANUFACTURE AND ASSEMBLY OF PARTITIONS
Filed Feb. 28, 1958 11 Sheets-Sheet 3

INVENTOR.
GEORGE J. MUMPER
BY
Wheeler, Wheeler & Wheeler
ATTORNEYS

Dec. 6, 1960  G. J. MUMPER  2,962,943
MANUFACTURE AND ASSEMBLY OF PARTITIONS
Filed Feb. 28, 1958  11 Sheets-Sheet 6

INVENTOR.
GEORGE J. MUMPER

Dec. 6, 1960

G. J. MUMPER 2,962,943

MANUFACTURE AND ASSEMBLY OF PARTITIONS

Filed Feb. 28, 1958

INVENTOR.
GEORGE J. MUMPER
BY
Wheeler, Wheeler & Wheeler
ATTORNEYS

United States Patent Office 2,962,943
Patented Dec. 6, 1960

2,962,943

MANUFACTURE AND ASSEMBLY OF PARTITIONS

George J. Mumper, 2348 S. 65th St., West Allis, Wis.

Filed Feb. 28, 1958, Ser. No. 718,366

13 Claims. (Cl. 93—37)

This invention relates to the manufacture and assembly of partitions.

Partition web stock fed on adjacent paths is acted on by synchronized punches which slot the respective webs except at those points at which one of the webs is left unslotted in the zones which are to constitute partition ends when the partitions are cut from the web. In practice, a cross strip slotting punch set is continuously reciprocated while there is an interruptible drive to a slotting punch set for the longitudinal web. The feed of the cross strip web through the continuously operating punch is interrupted at regular intervals while the feed of the longitudinal web is continued, thus providing unslotted zones in the longitudinal web. This web is later severed in these zones to form the partition ends.

Although the web stock is advanced step by step, my method and machine differ from previous practice in that a single row of slotting dies is used and at least one of the webs is advanced following every reciprocation of the slotting dies, whereby the operation is continuous. Previously used partition machines use multiple dies which punch in one operation all of the slots required for a given set of partitions. This requires excessive die cost, since a separate die is required for each different size of product. It also requires an excessive length of web feed in order to advance the stock for the whole length of the partition strip following each die operation. In contrast, the present machine and method advance the stock only by the space between two partitions regardless of the size of the desired product. The invention permits ready variation of the length of the partitions and the number of cross partitions without requiring any substitution of dies. This makes it possible for the partitions to be made in any length merely by adjustment of the machine.

Another feature of the present machine consists in a combined slotter and feed roller which advances and slits the web of stock following each operation of the single row of dies.

Another feature of the invention consists in the provision of means synchronized with the interruption in the slotting of the longitudinal partition stock web for interrupting the delivery of the lateral partition stock web so that the cut-off knife for the latter fails to sever any transverse partition strip except when there are slotted portions of the longitudinal strips available to receive the transverse partition.

Another feature of the present machine consists in a combined slitter and feed roller which advances and slits the web of stock following each operation of the single row of dies.

Figures 2, 3:
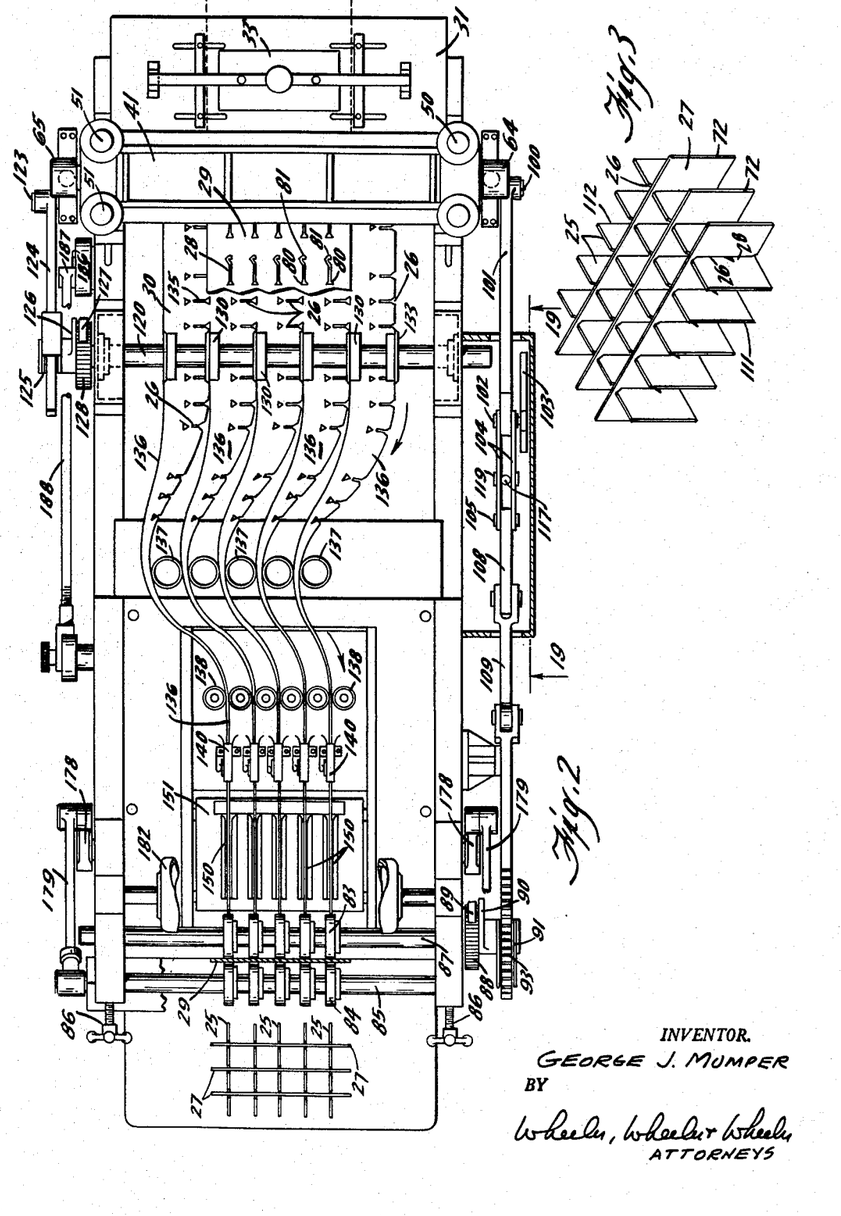
Fig. 2 is a plan view of the machine shown in Fig. 1, the said casing being shown in horizontal section.
Fig. 3 is a view in perspective showing on an enlarged scale a completed partition assembly made according to the invention.

The type of partition with which the present invention is concerned is shown in perspective in Fig. 3. For the purposes of this description, the partitions 25 which have upwardly opening slots 26 are characterized as longitudinal partitions. Although they happen to be shorter in the instant device than the transverse partitions 27, this is not necessarily the case. Regardless of their length, they are disposed longitudinally of the machine at the point where the downwardly opening slots 28 of the transverse partitions 27 are interlocked with the upwardly opening slots 26 of the longitudinal partitions 25.

Figure 1:
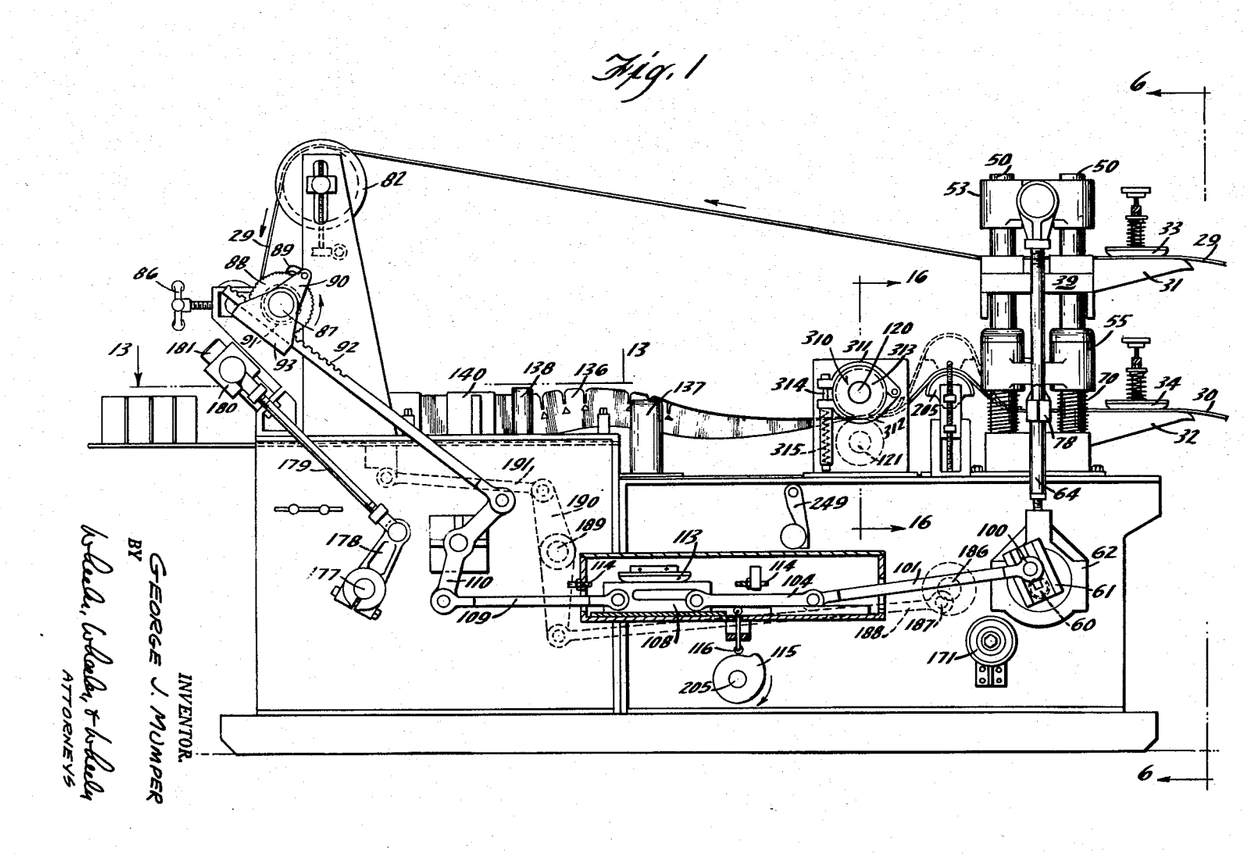
Fig. 1 is a view, largely in side elevation, showing a machine embodying the invention, portions of a casing being broken away.

The stock webs 29 and 30 enter the machine from the right as viewed in Figs. 1 and 2 over the respective feed tables 31 and 32 and subject to the frictional resistance of pressure plates 33 and 34 respectively. Stock web 30 provides material for the longitudinal partitions 25, while stock web 29 provides material for the transverse partitions 27.

In the first operation, the slots 26 are cut in web 30 and the slots 28 in web 29. In the device as shown in Figs. 1–23, the slotting is done by concurrent action of upper and lower die sets. The upper die set comprises punches 35 and cooperating dies 37. The lower die set comprises punches 36 and cooperating dies 38. In the embodiment of Fig. 24, the die sets which slot the respective webs are offset but still operated in synchronism to provide the proper number of slots and properly oriented partitions. The embodiment of Figs. 1–23 will be described first.

In each set, the punches and dies are arranged rectilinearly in a single row extending transversely of the paths of the stock webs 29 and 30 respectively. The webs are supported in the paths of the respective punches by the complementary dies 37, 38 respectively. The dies are adjustable for spacing along bed plates 39 and 40, while the respective punches are correspondingly adjustable upon punch carriers 41 and 42, each of which is mounted for vertical reciprocation with respect to the corresponding bed plate.

Figures 6, 7, 8, 9, 9A:
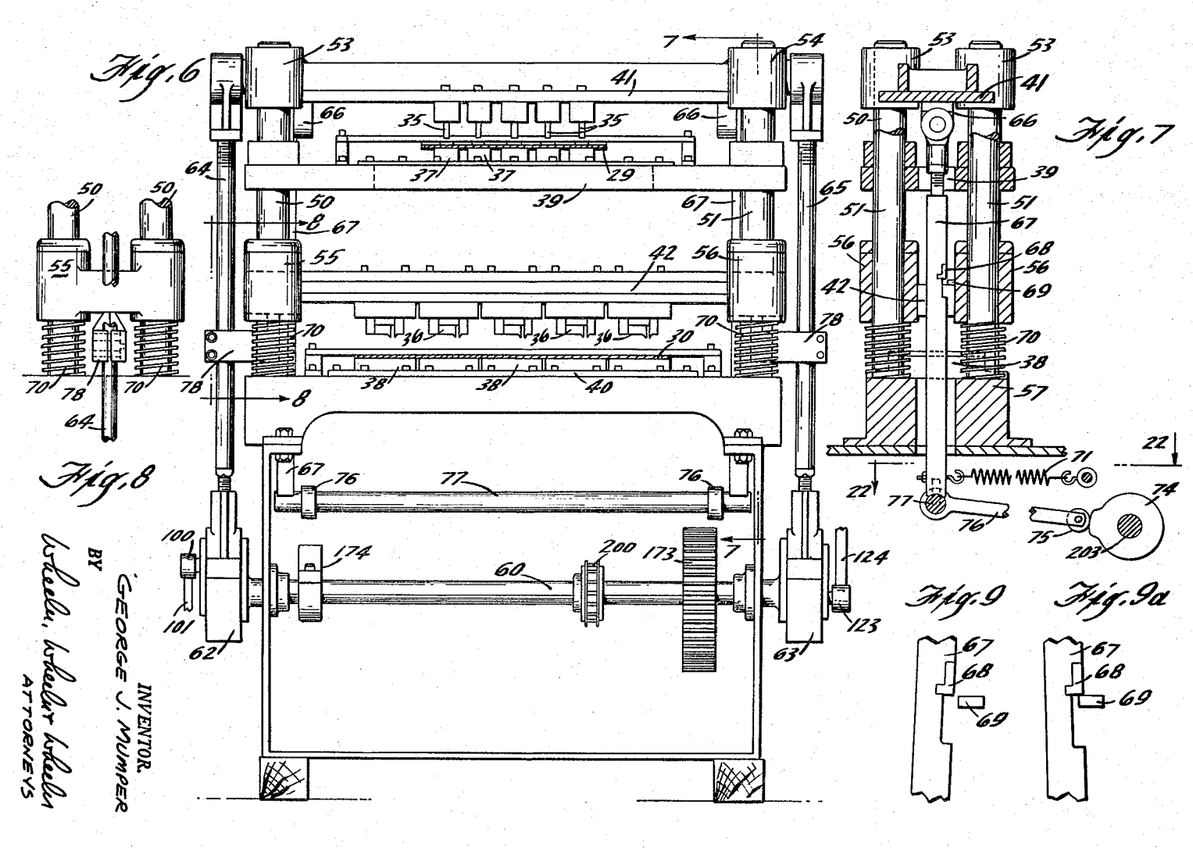
Fig. 6 is a view in end elevation taken on the line 6—6 of Fig. 1.
Fig. 7 is a detail view taken on the line 7—7 of Fig. 6.
Fig. 8 is a detail view taken in section on the line 8—8 of Fig. 6.
Fig. 9 is an enlarged fragmentary detail view of the parts shown in Fig. 7, illustrating such parts in different relative positions.
Fig. 9A is a view similar to Fig. 9 showing the same parts in different relative positions.

For this purpose, upright posts are provided at 50 and 51 disposed in pairs at opposite sides of the machine as best shown in Figs. 6 and 7. Each of the punch carriers 41 and 42 is provided at its ends with bearing sleeves reciprocable vertically on the posts 50 and 51. The sleeves of punch carrier 41 are shown at 53, 54, slidable on the posts 50 and 51 respectively. The bearing sleeves 55, 56 of punch carrier 42 correspondingly guide punch carrier 42. The bed plate 39 is also mounted on the post 50 but is fixed thereto. The bed plate 38 is mounted on the base 57 carried by the frame of the machine.

The operation of the punch carriers is as follows:

Extending transversely of the machine frame is a shaft 60 provided at its ends with eccentrics, one of which is shown at 61 in Fig. 1. These are encircled by straps 62, 63 (Fig. 6) connected by links 64, 65 to the upper punch carrier 41, whereby the upper punch carrier is in constant vertical reciprocation during the operation of shaft 60.

Motion for actuation of the lower punch carrier is derived from the movement of the upper punch carrier subject, however, to means for establishing a dwell at predetermined intervals. The ears 66 on the upper punch carrier have pivoted thrust members 67 adjustable as to length which extend downwardly from the upper punch carrier and are provided with striker shoulders 68 normally overlying complementary shoulders 69 on the lower punch carrier as best shown in Figs. 7, 9 and 9A. In this position of the parts, the positive downward movement of the upper punch carrier 41 will be transmitted through the arm 67 to the lower punch carrier 42. The upper punch carrier is also positively actuated in an upward direction, and the lower punch carrier follows it responsive to the bias of springs 70.

On those occasions when a dwell in the operation of the lower punch carrier is to be provided, the thrust arms 67 are pushed aside to the position shown in Fig. 9, in which position the shoulder 68 clears the shoulder 69, and the downward reciprocation of the upper punch carrier is not communicated to the lower punch carrier. Under these conditions, no slots are cut in the web 30. The purpose of this dwell, during the continued feed of web 30 by means hereinafter described, is to pass over that portion of the web 30 which is later to be severed to form unnotched end margins 111 and 112 when the web is later severed to make the partition 25 as shown in Fig. 3.

The lateral deflection of the thrust arm 67 is conveniently effected by the cam 74, cam follower roller 75, and push rod 76 as best shown in Fig. 7. This structure is duplicated at both sides of the machine. The push rods 76 act upon a crossbar 77 which links the lower ends of the thrust arms 67 as best shown in Fig. 6. The cams 74 which periodically shift the push rods 76 are mounted on a shaft 203 which is subject to the control of a variable speed transmission hereinafter to be described.

The push rods 76 do not necessarily act dependably when the setting of the machine is such that these arms must act with great rapidity. Under such circumstances, the one-piece push rods 76 are preferably replaced by the structure shown in Figs. 22, 23, 23a, 23b and 23c.

In the more complex push rod organization shown in these views, the push rod 760 is connected to the cross bar 77 and is provided with cam follower roller 75 in the same manner already described. However, there is pivoted to it at 761 a separate lever 762 biased counterclockwise as viewed in Fig. 23 by a tension spring 763 having a fixed anchorage 764 adjacent which there is a stop 765. The lower margin of the lever 762 normally rides on top of this stop as shown in Fig. 23, but the end of such lever is provided with a notch forming a shoulder 766 for engaging the stop 765 when the lever is displaced from the Fig. 23 position to the Fig. 23a position.

Figures 23, 23A, 23B, 23C:
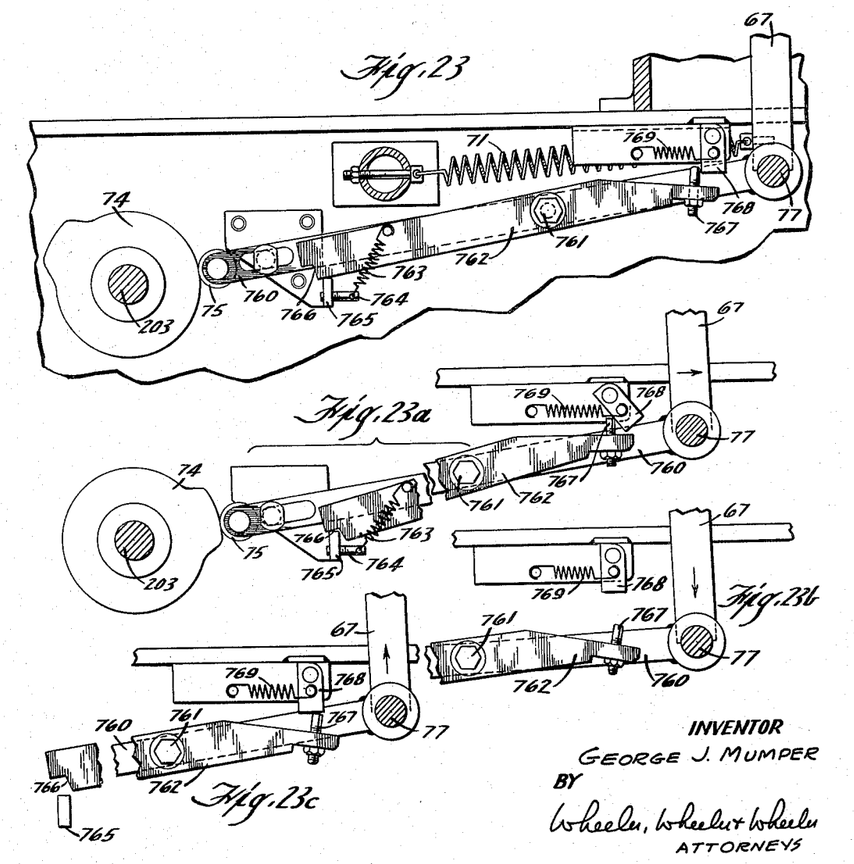
Fig. 23 is a view in side elevation of the parts shown in Fig. 22.
Figs. 23a and 23b and 23c are fragmentary detail views showing different positions of parts shown in Fig. 23.
Figure 24:
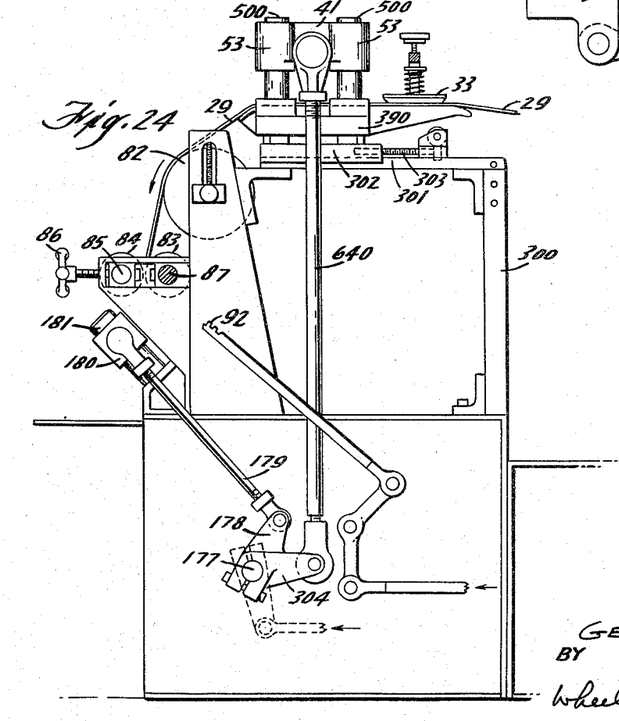
Fig. 24 is a fragmentary view similar to Fig. 1 showing partially in side elevation and partly in section a modified embodiment in which the punch sets are offset rather than superimposed.

At its righthand end, as viewed in Fig. 23, lever 762 carries an adjustable pin 767 which coacts with a detent 768 normally held in the position of Fig. 23 by a tension spring 769.

When the nose of cam 74 engages the cam follower 75 to push the thrust arms 67 to the right as viewed in Fig. 23, the detent 768 is pushed aside against the bias of its spring 769, and the auxiliary lever 762 clears the stop 765 and drops down to engage its shoulder 766 with such stop as shown in Fig. 23a. The thrust arms 67 are now tilted from the vertical to clear them from engagement with the lower die carrier as shown in Fig. 9 (the viewpoint, however, being reversed). Engagement of the shoulder 766 behind the stop 765 will retain the thrust arm 67 in its disengagement position, no matter at what speed the machine is operating.

On the ensuing downward stroke of the upper die carrier, and the corresponding downward movement of the thrust arms 67, the pin 767 will be disengaged from the detent 768 and the detent will spring back to its original position under bias of its spring 769 as shown in Fig. 23b. The thrust arms 67 will still be held deflected from the vertical due to continued engagement of shoulder 766 with stop 765.

However, as the upper punch carrier moves upwardly toward its original position, the pin 767 will now hit the lower end of the detent 768 due to the fact that the push rod 760 and its auxiliary lever 762 are still displaced to the right. This position of the parts is shown in Fig. 23c. Contact of the pin 767 with detent 768 during the upward movement of thrust push rods 760 will constrain levers 762 to pivot on their pivotal connections on bolts 761 with the push rods 760. This oscillation of levers 762 against their tension springs 763 will disengage the shoulder 766 from the stop 765 as shown in Fig. 23c. Since such engagement with the stop is all that has kept the thrust arm assembly displaced to the right against the bias of springs 71, the springs 71 will now react to draw the thrust arms 67 to their upright positions, whereupon the pins 767 will again clear the detents 768 as shown in Fig. 23.

The springs 70 provide support which maintains the punch carrier 42 in its elevated position during the dwell. While the springs are intended to have sufficient bias to elevate the punch carrier 42 after its downward actuation by the thrust members 67, the links 64, 65 are desirably provided with arms 78 which follow closely beneath the carrier 42 as shown in Fig. 6 and are adapted for positively engaging and actuating the carrier in an upward direction in the event that the bearing members 55, 56 stick on the posts 50, 51, As the stock web 29 leaves the punch and die set 35, 37, it has a transverse row of longitudinal slots which are to form the notches 28 when the transverse partitions 27 are severed from it. Each of these slots has a peculiar form clearly shown in Fig. 2, with one end wedge-shaped as indicated at 80 and the other end hook-shaped as indicated at 81. The line of severance is across the wedge-shaped ends of the slots, whereby to provide the surfaces which guide the complementary partitions in the assembling operation. The hook-shaped form which the slots have at 81 results in the provision of laterally projecting lugs which are deformed in the assembly of the partitions to assist in locking them securely together.

The transverse stock web 29 passes under tension about the guide pulley 82 (Fig. 1) and thence downwardly between the feed rolls 83 and 84 as shown at the left in Fig. 2. The feed rolls 84 are mounted to idle on a shaft 85 which is subject to the clamping pressure of the set-screws 86. The feed rolls 83 are positively driven. The shaft 87 upon which these are mounted carries the ratchet wheel 88 engaged by a pawl 89 on the feed lever 90, the hub of which carries a pinion 91 meshing with rack 92. A yoke 93 supports the rack in mesh with the pinion. Reciprocation of the rack upwardly to the left as viewed in Fig. 1 retracts the pawl 89 over the ratchet wheel 88 without imparting movement to the feed rolls 83. Retraction of the rack downwardly and to the right as viewed in Fig. 1 oscillates the lever 90 and ratchet wheel 88 counterclockwise for the feeding advance of the rolls 83 to draw a length of the stock web 29 through the die set and to deliver the forward end of such web downwardly across the bed knife 95 in the path of the cut-off shear 96 shown in Fig. 5. The advance of the web 29 is timed to occur during dwell of the punches 35 in their retracted positions and during dwell of the cut-off shear in its retracted position.

Figure 25:
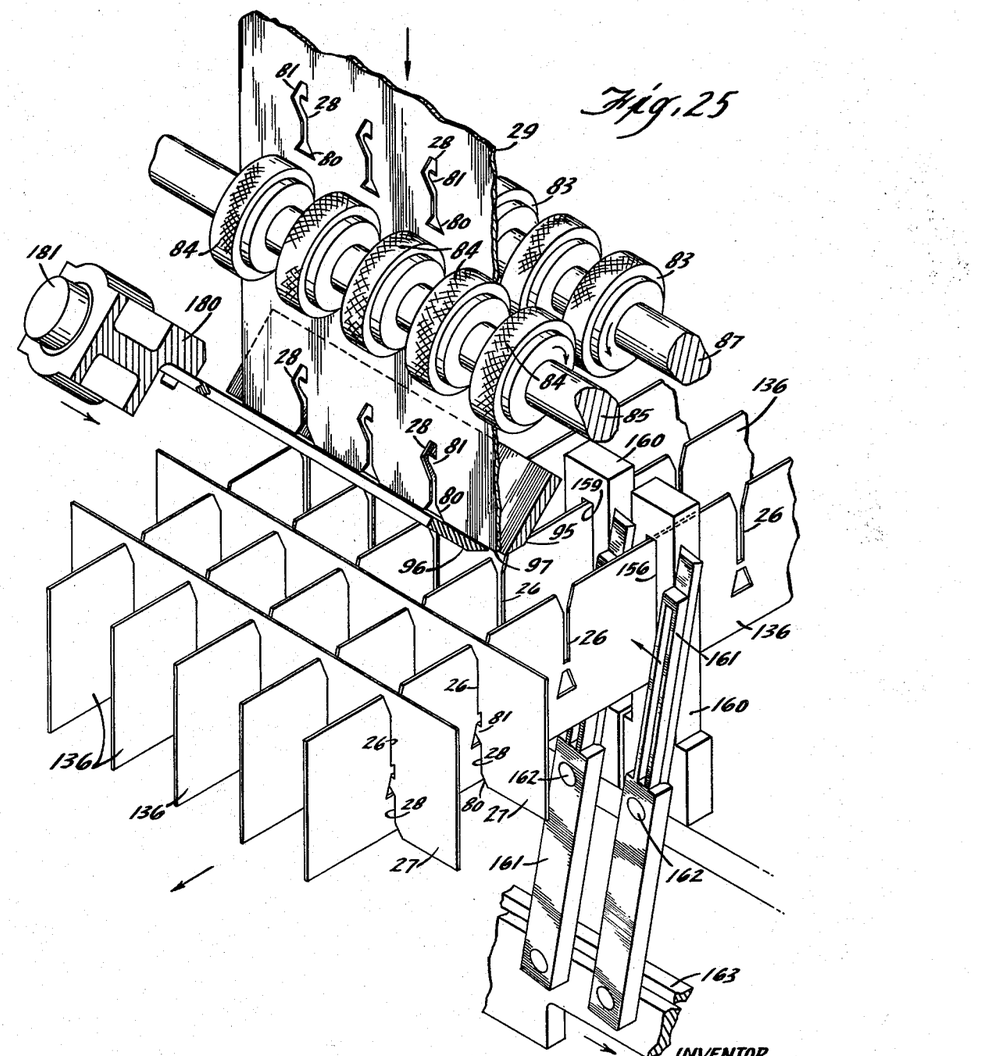
Fig. 25 is a fragmentary view of the cut-off shears in perspective on an enlarged scale.

As shown in Fig. 25, the advancing end 97 of stock web 29 (which is to constitute a partion 27) is actually interlocked with the portion of the longitudinal stock web which is to constitute the partition 25 before either partition is severed.

The means by which the rack 92 is reciprocated to effect intermittent operation of the feed roll shaft 87 and the power driven feed rolls 83 thereon will now be described with particular reference to Figs. 1, 2, 19 and 20.

The power shaft 60 which carries the eccentrics for the operation of the punches of the die sets is also provided with a crank pin 100 which is radially adjustable to vary the throw of the connecting rod 101 pivoted thereon. At its end remote from the crank pin 100, the shaft 101 has a pintle 102 which rides on a bearing block 103 and pivotally connects links 104 to the connecting rod 101. A cross pin 105 connects these links and rides in the downwardly turned notch 106 at the end of a slot 107 in a reciprocably mounted slide 108. The link 109 and bell crank 110 operatively connect the slide 108 with the rack 92 for the operation thereof.

From time to time it becomes necessary to establish a dwell in the feed of the stock web 29 from which the transverse partitions are cut. This occurs whenever stock web 30 is to be severed in the manner hereinafter to be described. The severance forms the leading and trailing ends 111 and 112 of the partitions 25 as shown in Fig. 3. It will be obvious that at these points no cross partitions 27 are required. Accordingly, the feed of the stock web 29 is interrupted and the punches 35 simply reciprocate idly through slots 23 already cut.

To effect this interruption in the feed of stock web 29, the cross pin 105 is lifted out of the notch 106 in slide 108 to reciprocate idly in the slot 107 of that slide. This is done by means of the cam 115 which, at the proper time, engages the cam follower 116 to elevate push rod 117. This push rod has a transverse pin 118 which mounts rollers 119 underlying the parallel links 104. Since this will occur immediately preceding the thrust of connecting rod 101 upon the links 104, the cross pin 105 will be at the level of the slot 107 when this thrust occurs, and the advance of the cross pin will not communicate motion through the slide 108 to the rack 92 and the feed rolls 83. The means for the timed operation of the parts will be described later.

Figures 19, 20:
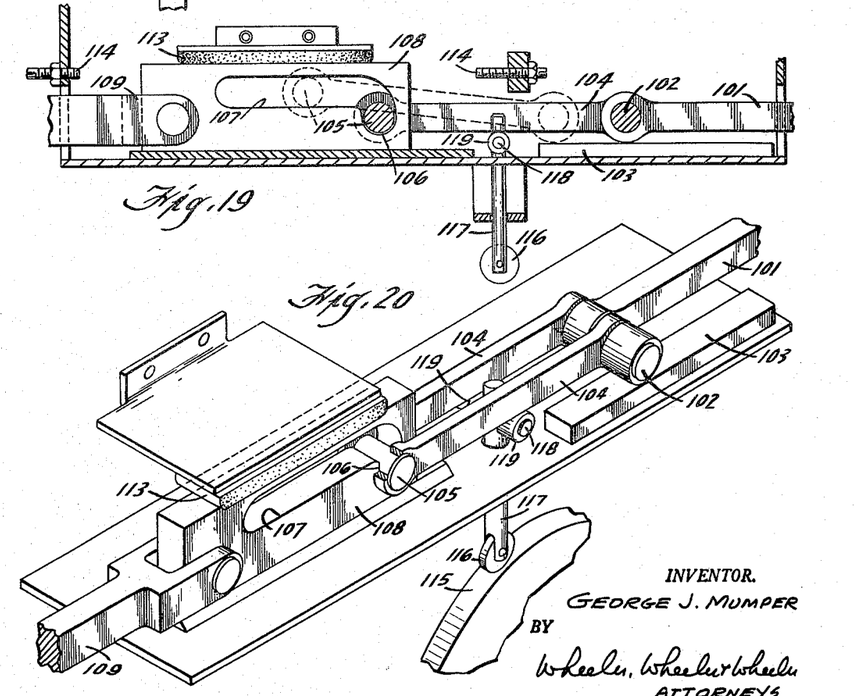
Fig. 19 is a detail view taken in section on an enlarged scale on line 19—19 of Fig. 2.
Fig. 20 is a view in perspective fragmentarily illustrating the parts shown in Fig. 19.

To hold the slide 108 against accidental displacement while the pin 105 is moving forth and back, a stationary friction shoe 113 bearing on the slide is preferably used as shown in Figs. 19 and 20. Slide movement is desirably limited with precision by adjustable stop screws 114.

Figure 16:
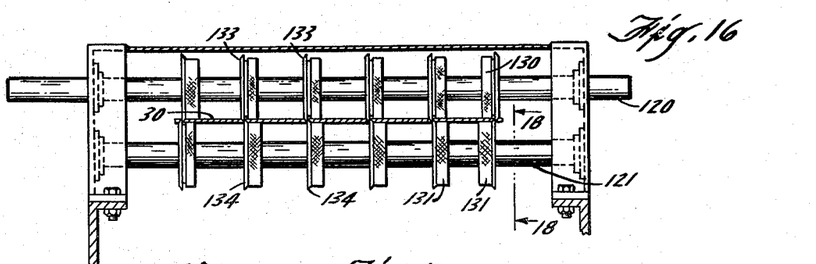
Fig. 16 is a detail view taken in section on line 16—16 of Fig. 1.
Figure 17:
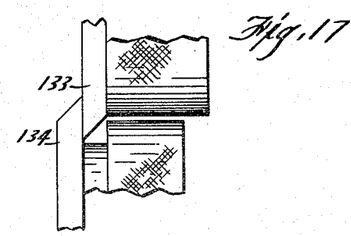
Fig. 17 is a detail view on an enlarged scale taken in the same plane as Fig. 16.
Figure 18:
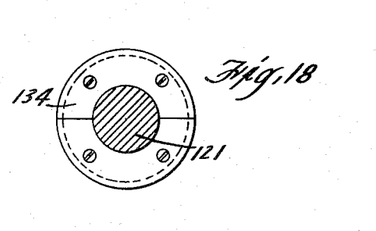
Fig. 18 is a view on an enlarged scale taken on line 18—18 of Fig. 16.

The stock web 30, after leaving the punch and die set 36, 38 and having been punched according to the preferred pattern clearly shown in Fig. 2, will pass through a set of feeding and slitting rolls separately illustrated in Figs. 16 to 18. There are two shafts 120 and 121, the upper shaft 120 being positively driven by radially adjustable crank pin 123, rack 124 (Fig. 2), pinion 125, lever 126, pawl 127 and ratchet 128. The crank pin is radially adjustable on the shaft 60 at the end opposite the adjustable crank pin 100 already referred to. The drive through the adjustable crank pin, the rack and pinion, and the pawl and ratchet enables the advance of the stock web 30 to be accurately controlled, the organization being quite similar to the drive to the feed rolls 83 and 84 which act on stock web 29. To prevent overrun, brakes 129 desirably are used on the shaft 120 of the longitudinal partion web feed rolls and shaft 87 of the transverse partition web feed rolls.

However, in addition to the positively driven feed rolls 130 on shaft 120 and the cooperative idler feed rolls 131 on shaft 121, the two shafts coact with disc knives 133, 134 which slit the broad web 30 at the bases of the transverse die cut slots 135 to form the upwardly open notches 26 in individual webs 136 from which the longitudinal partitions 25 are cut.

Figure 13:
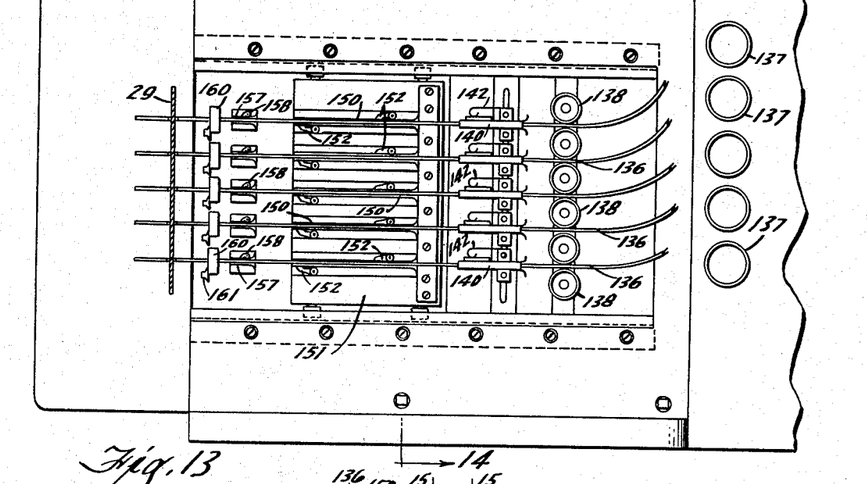
Fig. 13 is a detail view taken in section on line 13—13 of Fig. 1.

At the time the web 30 is longitudinally slit to form the individual webs 136, it is horizontal as shown in Figs. 1 and 2. However, in passing between the vertical guide rolls 137 and 138, the individual webs 136 are turned to vertical planes, and they are positively located in the desired planes when they traverse the guide throats 140 (Figs. 1, 2 and 13). These throats carry friction pads 141 pressed against respective webs by springs 142 (Fig. 15) to maintain under tension those portions of the webs engaged by pawls 152.

Figure 14:
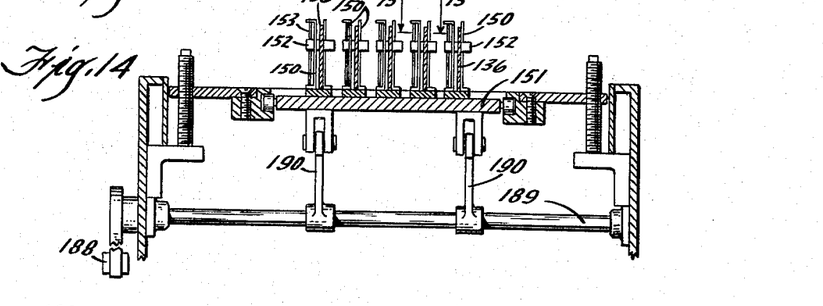
Fig. 14 is a detail view taken in section on line 14—14 of Fig. 13.
Figure 15:
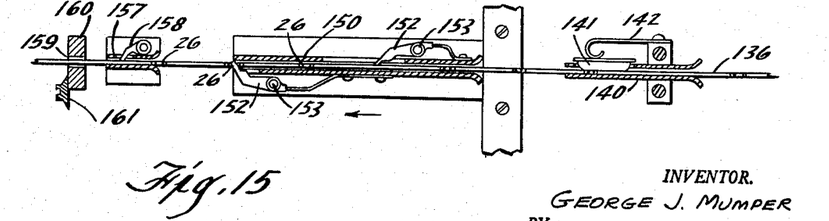
Fig. 15 is an enlarged detail view in section through a web feeder and shear on the line 15—15 of Fig. 14.

Just beyond the guide throats 140, the individual slit webs 136 pass through a battery of feeders best shown in Figs. 13, 14 and 15. Each feeder comprises a pair of plates 150 spaced to receive the individual webs 136 and mounted for bodily reciprocation with the carriage 151 in a direction longitudinally of the path of the web.

Pawls 152 pivoted on rock shafts 153 at opposite sides of the respective plates are biased by their respective springs 154 into engagement with portions of the web exposed through openings 155. The pawls 152 are offset longitudinally of the respective webs by an adjustable distance approximately corresponding to the spacing between consecutive notches 26. One pawl per web would suffice to advance the web intermittently in accordance with the reciprocation of the feeder except for the fact that, as explained above, there are intervals in which the web is unnotched. When both pawls engage notches, both act concurrently to engage the web at the edge of the respective notch to propel the web for the distance of advance of the carrier 151. However, if one pawl engages an unotched portion of the web, the web will be advanced by the other pawl, this being the reason for longitudinally offsetting the pawls.

Just beyond the feeders, the individual webs pass through stationary guides 157 (Fig. 13), each of which comprises a dog 158 acting on the web to prevent retrogressive movement such as might otherwise occur in consequence of friction of the pawls 152 during the retractive movement of the feeders with the feed table 151.

Figure 4:
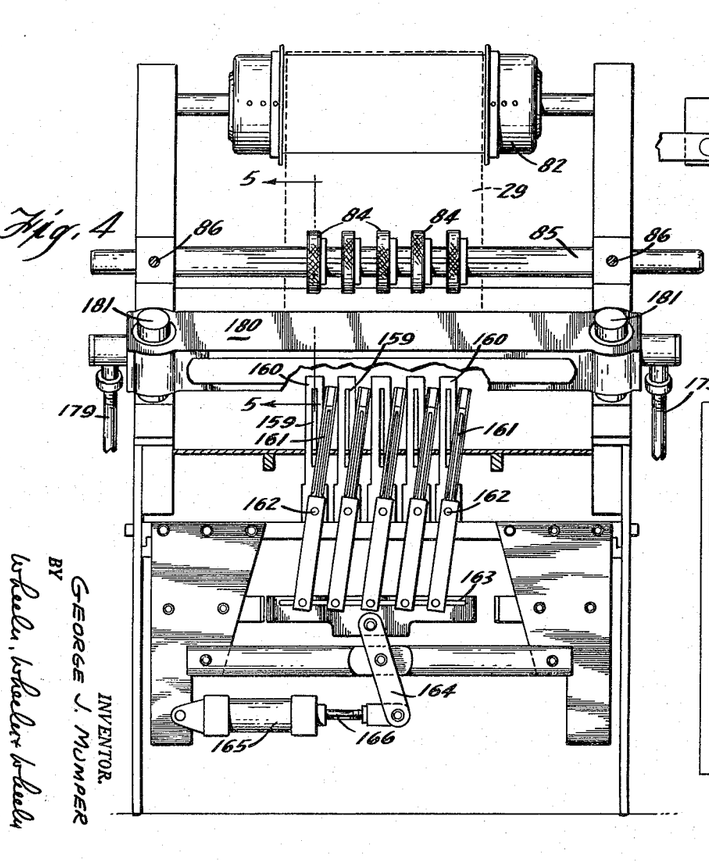
Fig. 4 is a view in end elevation of the machine shown in Fig. 1 and Fig. 2.
Figure 5:
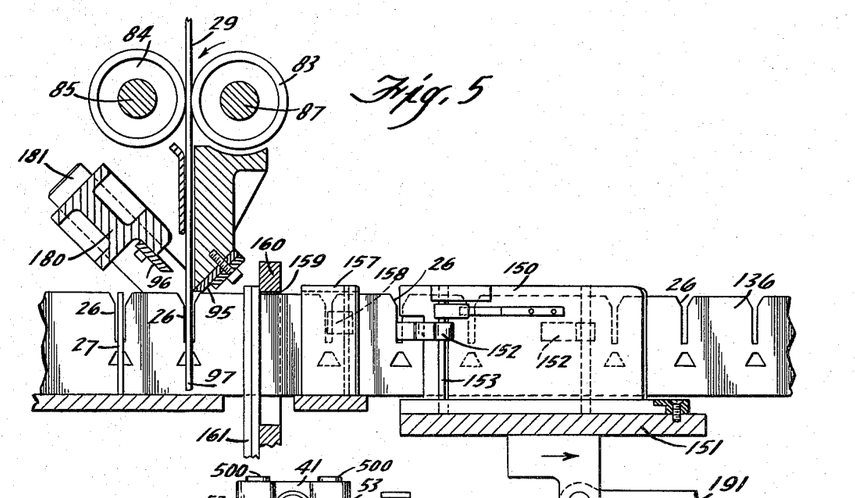
Fig. 5 is a detail view taken in cross section on the line 5—5 of Fig. 4.

The feeders just described advance the free end of the webs through the transverse shear mechanism shown in Fig. 4, whereby the partition members 25 are severed from the webs after the transverse partition members have been assembled thereto as shown in Fig. 5. The timing is such that the shearing is done in the unnotched area of each of the individual web sections intermediate a row of notches formed therein.

As a convenient means of transversely severing the slit web sections, the device shown in Fig. 4 has been found very satisfactory. The web is threaded through the slots 159 in the stationary shear members 160. The double-edged movable shear members 161 are pivoted at 162 and connected with a crosshead 163 for oscillatory movement in unison from one pivotal position to another, in the course of which the movable shears cross the slots 159 through which the work is threaded, thereby severing the several partitions simultaneously from the several slit stock webs of which they were previously component parts. The severance of partitions 25 and partitions 27 may occur concurrently to complete the product, the partitions being already assembled, as shown in Figs. 5 and 25.

The movement of the crosshead 163 has conveniently been effected by means of lever 164, and the double-acting ram 165 to whose piston 166 the lever 164 is pivoted. Following each oscillation of the movable shear blades 161, the shear blades dwell during the next advance of the several stock webs effected by means of the feeders above described and shown in Figs. 13, 14 and 15. As in the case of the formation of the transverse partitions, the longitudinal partitions remain as integral parts of their respective stock webs until the transverse partitions have all been assembled thereto in the successive operations of the feed rolls 83 and 84 and the knives 95 and 96 as previously described. Only when the last of the transverse partitions is assembled to the longitudinal partitions is the set of shear knives 161 oscillated to sever the longitudinal partitions and complete the device shown in Fig. 3. By keeping the partition stock as an integral part of the stock web until the assembly is complete, in both instances, the accurate relationship of the parts is promoted.

Figure 10:
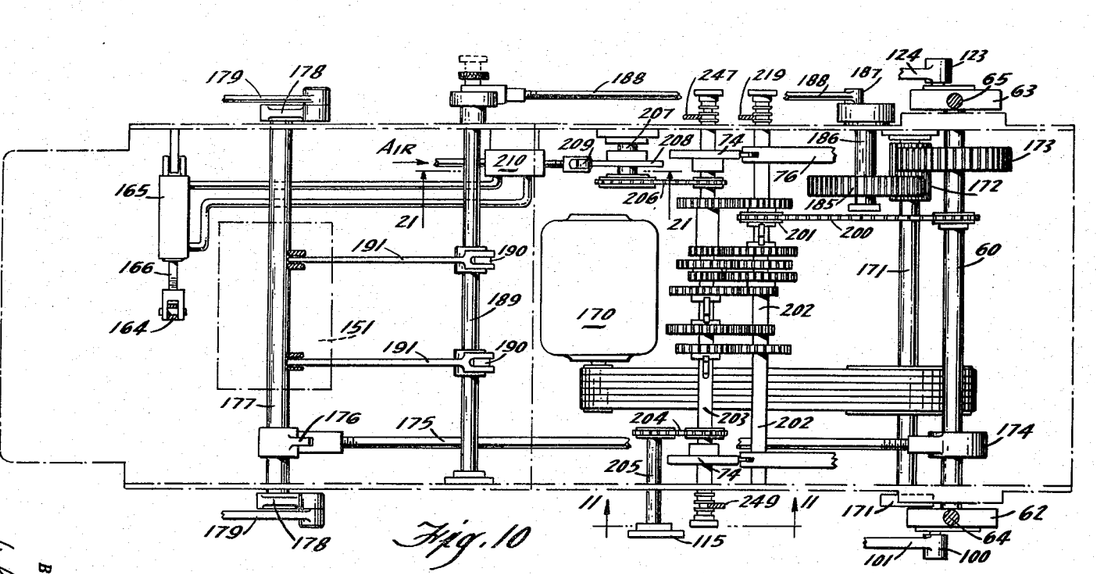
Fig. 10 is a diagrammatic view in plan of the driving connections for the machine.
Figure 11:
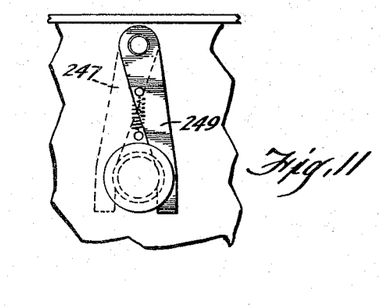
Fig. 11 is a detail view taken on line 11—11 of Fig. 10.
Figure 12:
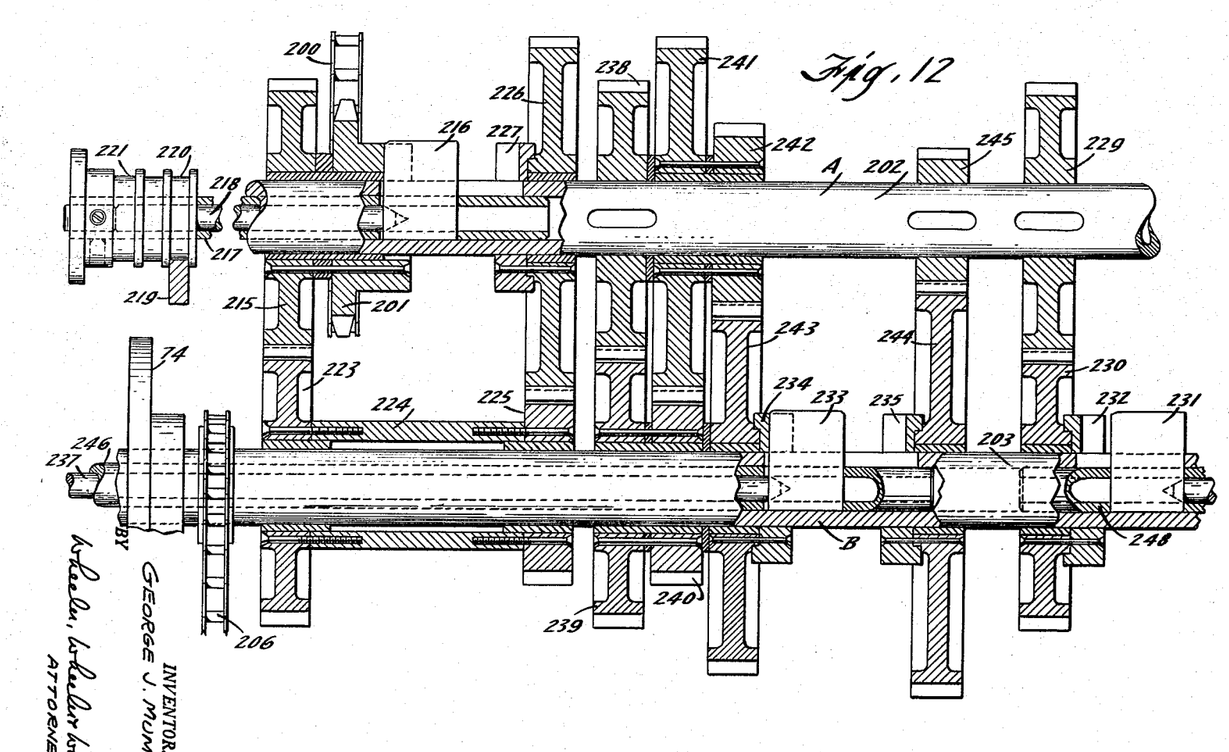
Fig. 12 is an enlarged detail view through the driving connections in axial section, portions being broken away.

Figs. 10, 11 and 12 show the means by which the several parts are timed and operated in an actual embodiment of the invention as thus far described.

The electric motor 170 (Fig. 10) drives the shaft 171. Means has already been described whereby the punch and die sets and the feed rolls 83 for stock web 29 are driven from shaft 60, this shaft being actuated from shaft 171 by means of pinion 172 and gear 173. To keep web tension from affecting the timing of the machine, shaft 171 is desirably provided with an over-running clutch 169 which may be of the type disclosed in Dodge Patent 2,366,843 and which is so mounted as to permit shaft 171 to rotate in one direction only.

The shear 96 which severs the transverse partitions 27 from stock web 29 is also driven from shaft 60 by means of the eccentric 174, connecting rod 175, bell crank 176, rock shaft 177, crank arms 178, and the connecting rods 179 (Figs. 1 and 10) which link the crank arms 178 with the crosshead 180 which is reciprocable on the posts 181 (Figs. 4 and 5) and carries the cut-off knife 66 already described.

Also meshing with the pinion 172 on drive shaft 171 is gear 185 on jack shaft 186. The crank pin 187 on this jack shaft actuates through connecting rod 188 a rock shaft 189 having arms 190 connected by links 191 with the feed table 151 which carries the feeders shown in Figs. 13 to 15 and above described.

Figure 21:
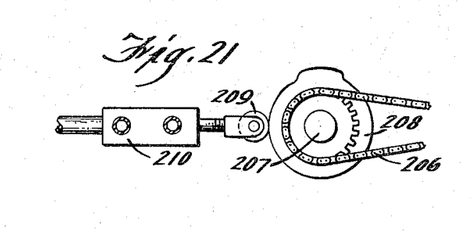
Fig. 21 is a detail view taken in section on line 21—21 of Fig. 10.

Driven by chain 200 from the drive shaft 171 (Fig. 11) is the sprocket 201 on transmission shaft 202. Various gear pairs are provided as best shown in Fig. 12 for the delivery of motion to transmission shaft 203. Among other things, this shaft powers the cam 115 (Fig. 1 and Fig. 20). The drive is through a chain 204 to the cam shaft 205. Also driven from transmission shaft 203, by means of chain 206 is a cam shaft 207 carrying a cam 208 whose follower 209 operates an air valve 210 for controlling the admission of air to the ends of the double-acting ram 165 which operates the cut-off shears for the longitudinal stock web, the shears being best shown in Fig. 4. The cam 208 has the general contour shown in Fig. 21 to produce the dwell required of the shears as already described.

The transmission gear pairs and the means by which they are made effective will now be described with particular reference to Fig. 12.

Sprocket 201 is the source of power for the transmission. It is connected with gear 215 for rotation free of shaft 202 except when the sprocket is connected to the shaft by a key 216 slidable axially of the shaft by means of the tubular shifting rod 217 and the key anchoring pin 218 therewithin. The shifter is locked in a selected position of adjustment by engagement of a detent lever 219 (compare Fig. 11) with either of the spools 220 or 221 which register with the lever in the different positions of key 216.

Gear 215 meshes in 1:1 ratio with a gear 223 connected by sleeve 224 with a pinion 225, this assembly being freely rotatable coaxially with shaft 203 and being mounted on said shaft solely as a matter of convenience. In the instant device no drive from this assembly to the shaft 203 is used. Pinion 225 meshes with gear 226 which is rotatable freely on shaft 202 except as clutched thereto by the shiftable key 216. When this key is disengaged from sprocket 201 by release of detent 219 and actuation of the shifter, it may be engaged with the corresponding jaw 227 connected with gear 226. The spool 221 will then register with the detent 219, and the shifter may be locked thereby in its new position. The ratio between pinion 225 and gear 226 is 1:2. Thus, in this section of the transmission, means is provided for driving shaft 202 either at a 1:1 ratio in direct drive from sprocket 201 or at a 1:2 ratio by driving from sprocket 201 through gears 215, 223, 225 and 226.

Assuming that the output shaft 203 is to be driven at a rate which is either in the ratio of 1:1 or 1:2 respecting the driving sprocket 201, motion is transmitted from shaft 202 through gears 229 and 230 to shaft 203, such transmission depending on the engagement of the slidable key 231 with the jaw 232 to connect gear 230 with shaft 203. Gears 229 and 230 having 1:1 ratio to each other, it will be apparent that if these gears are used to drive shaft 203, shaft 203 will rotate at whatever ratio has already been imparted to shaft 202.

To produce different ratios, shaft 203 is also provided with a shiftable key 233 selectably engageable either with jaw 234 or with jaw 235, according to the position of the key as shifted by the tubular shifter 236 which is similar to the shifter 217 as above described. The key is similarly anchored in a slot in tubular shifter 236 by means of a retractable pin 237 corresponding to the pin 218 above described.

Assuming the key 233 to be engaged with jaw 234 as shown in Fig. 12, the drive is through the gear 238 fixed to shaft 232, gear 239 freely rotatable on shaft 233, gear 240 connected to gear 239, gear 241 and pinion 242 connected together to rotate as a unit free of attachment to shaft 202 and gear 243 with which pinion 242 meshes and which is connected to the jaw 234. The reduction achieved in this gear train is a 4:1 reduction so that, according to whether shaft 202 is clutched directly to sprocket 201 or is driven through gears 215, 223, 225 and 226, the driven shaft 203 will be rotated at a ratio of 4:1 or 8:1 respecting the sprocket.

If the key 233 is clutched to jaw 235 on gear 244, the drive will then be through pinion 245 on shaft 202. The ratio through this train is 3:1. Thus the drive to shaft 203 will either be 3:1 or 6:1 according to whether shaft 202 is directly driven from sprocket 201 or is driven through the 2:1 reducing gear train.

The shifter 246 for the key 233 is fixed in its several positions by the detent 247. The shifter 248 for the key 231 is controlled by detent 249 at the one side of the machine as shown in Figs. 10 and 11.

The effect of the transmission is to enable the shaft 203 to be rotated selectively in the various ratios (respecting the sprocket 201) of 1:1 or 2:1 or 4:1 or 8:1 or 3:1 or 6:1. The 1:1 output ratio is not used except for adjustments of the machine. The different ratios determine the number of cells in the finished partition set, two cells longitudinally of the set being the minimum. A 2:1 ratio produces two cells longitudinally of the set, a 4:1 ratio produces four cells, etc.

Also driven through the transmission are the cams 74 which actuate the follower 75 and push rod 76 to permit the lower punches to dwell following the punching of the slots for the required number of partitions. See Fig. 7 for this arrangement already described.

The chain 206 driven from the output shaft 203 of the transmission determines the timing of the cut-off knives 161 as operated by the double-acting ram 165 above described and shown in Fig. 4. The chain 204, driven from the same output shaft 203 of the transmission controls the timing of the cam 115 which disengages the feed of the transverse partition web stock when the end of one of the longitudinal partitions underlies the path of downward advance of the transverse partition web. Obviously, these parts of the machine must be synchronized with each other, and it must be possible to vary them in connection with the rest of the machine in order to control the length of the longitudinal web.

The height of the longitudinal partitions is determined first by the width of the stock web 30 fed into the machine, and secondly by the spacing of the cut-off and knives and feed rolls 133, 134 and 130, 131 on their respective shafts 120 and 121 (Figs. 16 and 17). To permit of ready replacement of the knives, these are desirably bolted to the feed rolls as shown in Fig. 18.

The height of the transverse partition webs is necessarily controlled by the advance of such webs in each operation of their feed rolls 83, 84 as controlled by the radially adjustable crank pin 100 (Figs. 1 and 2).

The spacing between the slots 26 of the longitudinal webs will be determined by the advance of such webs in each operation, this being in turn controlled by the extent of reciprocation of the feed table 151 as already described above. The length of web travel between the die set and the feed carriage 151 should be a multiple of the distance the web is advanced between operations of the punch. This distance is varied by adjusting the height of the guides 205 over which each longitudinal web 30 is trained between the die set and the feed rolls (Fig. 1). The spacing between the slots 23 which form the notches of the transverse webs is determined by the spacing of the dies 36 on the carrier 42. These are adjustable along the carrier as clearly appears from Fig. 6.

The fact that a single row of dies operates on each of the respective webs in consecutive positions of web advance makes it possible to bring about all of these various adjustments without requiring the provision of a separate die for each different product. In one embodiment of the machine, it was found desirable to move to a new location closer to the cut-off dies the die set for punching the upper web from which the transverse partitions are cut. Fig. 24 may be compared with Fig. 1 to show the altered structure.

The supplemental frame 300 provides a way 301 upon which the table 302 is adjusted by screws 303 to time the operation of the punches accurately with respect to the points on the web 29 at which the slots must be punched.

The platen 390 is substituted for the platen 39 as a means of supporting the dies. The posts 500, 510 project upwardly from the platen to guide the bushing portions 53, 54 of the die carrier 41, this being identical with the die carrier used at 41 in the embodiment shown in Figs. 1, 6 and 7. In fact, the carrier 41 continues in use at the input end of the machine, but it now performs no die carrying function but merely serves to transmit motion through the displaceable thrust arms 67 to the lower die carrier 42, subject to periodic interruption when the lower web 30 is not to be acted upon. The link 640 (duplicated by a link (not shown) on the other side of the machine) performs the function of the link 64 of Fig. 6 in transmitting motion to the upper punch carrier 41 which carries the punches for acting on web 29. The link 640 may conveniently be operated from the rockshaft 177 by providing a new arm on said shaft at 304 with which the link 640 is connected. This arrangement reciprocates the punch carrier 41 downwardly in synchronism with the operation of the cut-off shear head 180.

By adjustment of the screws 303 to shift table 302, the clearance between the die set and the cut-off knife can be varied according to the requirements of the work. Adjustment can also be made by raising or lowering the idler roll 82. The advantage of this arrangement is to eliminate most of the web stretch which, in the general organization of Fig. 1, could occur between the point where the notching was done and the point where the partition was severed.

In either embodiment of the invention, it is possible to operate either of the webs independently of the other in order to effect preliminary adjustments of the machine. This is done by disengaging the clutch through which shaft 189 is driven. Also, the dogs not required to drive the several ratchets (for example, dogs 89 or 127, Fig. 2) can be thrown out of ratchet engaging position.

Another feature making for precision in the functioning of the machine is the spring loaded brake 310 which acts on the feeder and slitter shaft 120, Figs. 1 and 16. The pivotally connected brake arms 311 and 312 encircle the brake drum 313 and have ears at their free ends connected by the rod 314 and compression spring 315. It has been found that brakes previously employed on partition making machines to preclude over-run and retrogressive yielding of the feed rolls under tension of the web have wide variation in braking action as they become heated in the course of operation. The spring loaded brake shown has a spring of such length as to accommodate dimensional changes due to heating without any appreciable variation in its bias, thereby giving uniformity of braking action.

Figure 26:
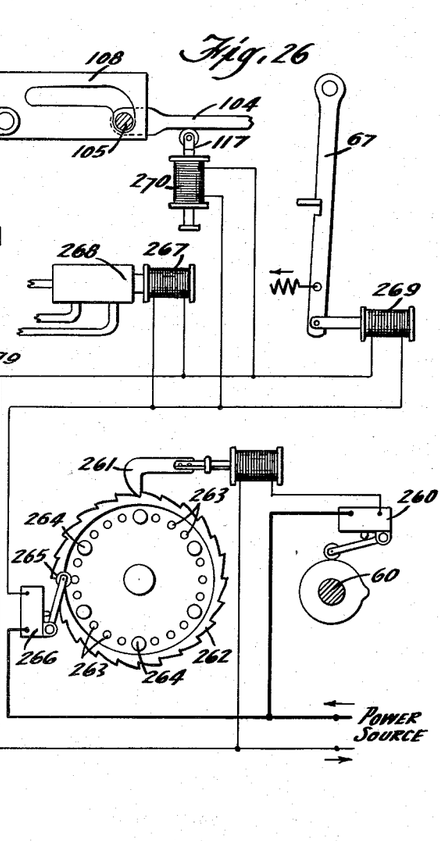
Fig. 26 is a diagrammatic view of an alternative electrical control of certain web feed, cut-off, and piercing operations.

Fig. 26 shows diagrammatically how the adjustments made mechanically in the transmission of Fig. 12 can also be made through a timer using electrically actuated controls.

Figure 22:
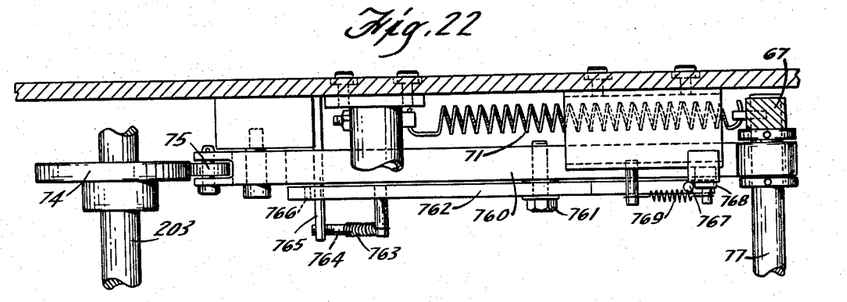
Fig. 22 is a view on an enlarged scale in the plane indicated at 22—22 in Fig. 7, but showing a preferred embodiment differing from that of Fig. 7.

Just as the sprocket 201 of the transmission makes one turn for each cycle of reciprocation of the punch and die sets, controlled by shaft 60, so the device of Fig. 22 mounts a cam on shaft 60 to close the switch 260 once in each reciprocation of the punches. This cam magnetically actuates the pawl 261 to advance by one tooth the dividing head 262. This head has twenty-four ratchet teeth and is provided with a socket 263 for each tooth. In appropriate sockets, pegs 264 are inserted. In the path of these pegs is the actuator 265 of a switch 266 so that the circuit through the switch is closed every time one of the pegs passes the actuator. There being twenty-four sockets for the pegs, it will be apparent that the switch can be made to produce 1, 2, 3, 4, 6, 8, 12 or 24 impulses per rotation of the divider head 262. The minimum practical number of two cells is produced by inserting pegs in every other socket. To produce three cells, pegs are inserted in every three sockets. To produce four cells, pegs are inserted in every fourth socket, etc. All the ratios produced by the transmission are included.

These impulses operate through solenoid 267 to actuate the air valve 268 for the ram 165 which shears the longitudinal partitions of the stock webs. The impulses also energize the solenoid 269 which throws the lever 67 to release the lower punch carrier (Figs. 7 and 9) from the upper punch carrier at the predetermined point in the cycle. The impulses also energize the solenoid 270 to lift the thrust member 117 for disengaging slide 108 from push rods 104 to interrupt the downward feed of the transverse partitions (Figs. 2, 19 and 20). Accordingly, it is possible to achieve these operations electrically through the pegs used on the divider to close the necessary circuits.

In actual practice, a machine embodying the invention is adjustable to assemble partition sets having from four cells to forty-eight cells varying in width from two inches to six and one-half inches, the height varying from two inches minimum to eight inches maximum. All this is possible without any change whatever other than adjustment, with a single exception that where the height of the partitions is to be increased greatly beyond the normal two inch dimension, the dies are interchanged to provide greater slot depth.

I claim:

1. A method of manufacturing and assembling partitions, which method comprises the infeeding of two webs, punching rows of transverse slots in one web, subdividing said one web into sub webs along longitudinal lines intersecting the transverse slots near their respective ends, twisting the sub webs to positions in substantially parallel planes, intermittently advancing concurrently the several sub webs, punching longitudinal slots in the other web and intermittently advancing said other web and feeding its slotted end into interlocking engagement with the transverse slots of the sub webs, and thereafter cutting partition lengths from the several webs in dwells between successive advances thereof, and bringing about a dwell of said other web intermittently during advance of the sub webs and intermittently leaving a portion of said one web unpunched.

2. A machine for making and assembling partitions, said machine comprising upper and lower die sets including dies arranged in single rows transversely of the machine, punches respectively coacting with said dies, means for feeding stock webs across the respective dies, and means for effecting periodic dwell in the operation of the feeding means for one of said stock webs and in the operation of the punches for the other.

3. The device of claim 2 in which the punch and die sets for the respective webs are substantially superimposed, the punches having the periodic dwell being normally actuated from the other punches, and the means for producing the periodic dwell comprising mechanism for normally transmitting motion from said other punches, and mechanism for interrupting at predetermined intervals the functioning of said mechanism.

4. The combination with separate stock web feeders, of die sets comprising dies arranged in transverse series across the paths of the respective webs, punches operatively reciprocable to and from coaction with respective dies in said sets, means for normally transmitting motion from punches of one set to punches of the other, said means including mechanism for interrupting the transmission of motion to said other set of punches at predetermined intervals in the operation of the set of punches from which the motion is transmitted.

5. The device of claim 4 in further combination with means for slitting longitudinally the stock web upon which the said other set of punches acts when motion is transmitted thereto, means for the step by step advance of the individual stock webs into which the last mentioned stock web is slit, means for actuating said advancing means following every operation of the set of punches from which the motion is transmitted, and means for advancing the other of said stock webs, said last advancing means having means for effecting a dwell in the advance of the last mentioned stock web once for each interruption in the transmission of motion to the set of punches acting on the first mentioned stock web.

6. In a device for manufacturing and assembling partition strips, the combination with two sets of single row dies and punches arranged for operation upon separate stock webs, of means for reciprocation of the respective sets of punches in coaction with their respective dies, one of said sets of punches being in continuous operation and the other having mechanism for interrupting its operation at predetermined intervals, the punches forming slots in the stock webs for the interlocking engagement of the partitions ultimately cut therefrom, and means for advancing one of said stock webs a distance no greater than the distance between two consecutive partitions following every operation of the punch set acting thereon.

7. The device of claim 6 in further combination with means for advancing the stock web for the coacting partition for a distance no greater than the distance between two consecutive partitions following some operations of the punch set acting thereon and for causing said last mentioned web to dwell periodically following other operations of the punch set acting thereon.

8. In a device of the character described, the combination with means for feeding two separate webs, of two separate die sets, each comprising a row of dies and a corresponding row of punches, the webs being guided between the dies and punches of respective sets, means for effecting reciprocation of the punches of one set at regular intervals, interruptible means for transmitting motion from the punches of one set to the punches of the other set, and means for periodically interrupting said motion transmitting means.

9. The device of claim 8 in which the punches of the second set are spring supported and the motion transmitting means comprises a thrust member deflectible to and from positions of engagement with the spring supported punches of the second set, and means for periodically deflecting said thrust member from its position of such engagement.

10. The device of claim 8 in which the punches of both sets are mounted on carriers, and the respective carriers are reciprocable upon a set of guides common to both sets.

11. In a device of the character described, the combination with means for feeding a web, of means for slitting said web into a plurality of sub webs, means for twisting the sub webs into parallel spaced relationship, means for intermittently advancing the sub webs, opposed shears at opposite sides of the path of each sub web, double edged shear knives operatively mounted for movement across the paths of the sub webs for coaction alternately with the respective shears of said pairs, and means for periodically actuating said knives concurrently across the paths of the several sub webs during the dwell of the sub webs and for effecting a dwell of each knife during the periodic advance of the sub webs.

12. The device of claim 11 in further combination with means for feeding a partition strip into interlocking connection with the several lengths of sub web advanced beyond said shears, such engagement being effected prior to actuation of said knife.

13. In a device of the character described, for assembling partitions from a pair of separate webs, the combination with separate die sets for the respective webs, each die set comprising a plurality of punches and a plurality of dies, carriers for the punches and dies of each set upon which the respective coacting dies and punches are relatively adjustable for varying the separation therebetween, means for reciprocating one carrier toward the other in each set, the reciprocating means for effecting relative movement between the carriers of one set being in substantially continuous operation, and the reciprocating means for effecting relative movement between the carriers of the other set having means for effecting a periodic dwell in which the punches and dies of said other set do not coact, means for longitudinally slitting one of said webs into a plurality of sub webs, means for twisting said sub webs into substantially parallel and laterally spaced positions, guides for the sub webs provided with means for lateral adjustment therebetween to vary the spacing between the sub webs, means for advancing the sub webs, means for varying the extent of advance of the sub webs, means for advancing a die cut end of the unslit web into engagement with die cut portions of the respective sub webs during dwell in the advance of the sub webs, and means for severing the unslit web after the end thereof has been fed into engagement with the sub webs, means for advancing the sub webs and feeding the severed end of the unslit web into engagement with other die cut portions of the sub webs following such advance, means for again severing the end of the unslit web following such engagement, means for advancing the sub webs, and means for severing the sub webs following such advance to complete a partition assembly, the adjustments aforesaid providing for variation in the number of cells in said assembly and in the cross sectional dimensions of said cells and in the height of the sub webs and the severed ends of the unslit web as assembled.

References Cited in the file of this patent
UNITED STATES PATENTS

| | | |
|---|---|---|
| 2,742,827 | Schroeder | Apr. 24, 1956 |
| 2,744,751 | Janz | May 8, 1956 |
| 2,769,494 | Spurrier et al. | Nov. 6, 1956 |
| 2,785,749 | Wilson et al. | Mar. 19, 1957 |
| 2,802,406 | Lindsay | Aug. 13, 1957 |
| 2,817,515 | Przysiecki | Dec. 24, 1957 |